W. E. HASKELL.
ORGAN PIPE.
APPLICATION FILED DEC. 29, 1909.
967,911.
Patented Aug. 23, 1910.
2 SHEETS—SHEET 1.
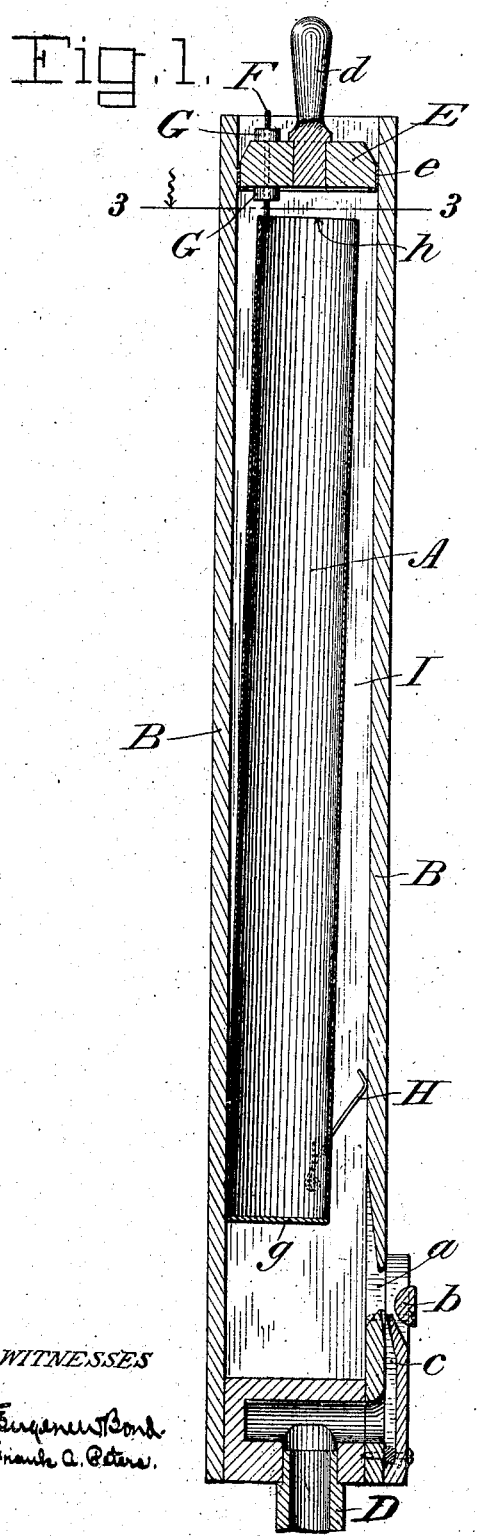
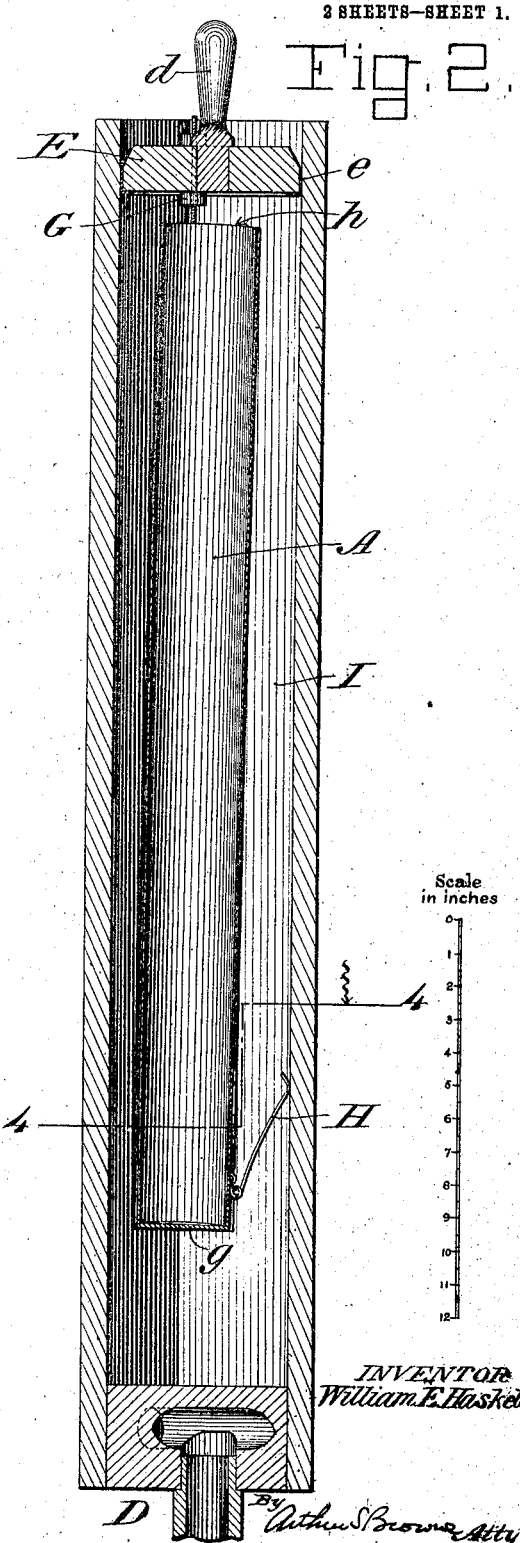
Scale in inches
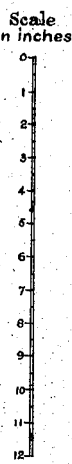
WITNESSES
Eugene W. Bond
Frank A. Peters
INVENTOR
William E. Haskell
By Arthur S. Browne Atty

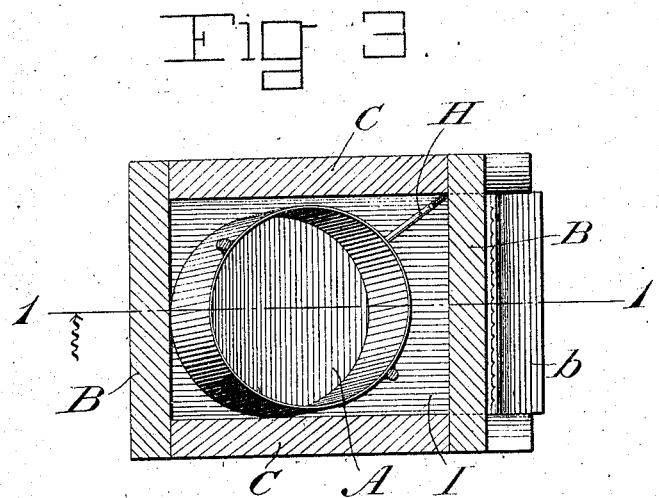
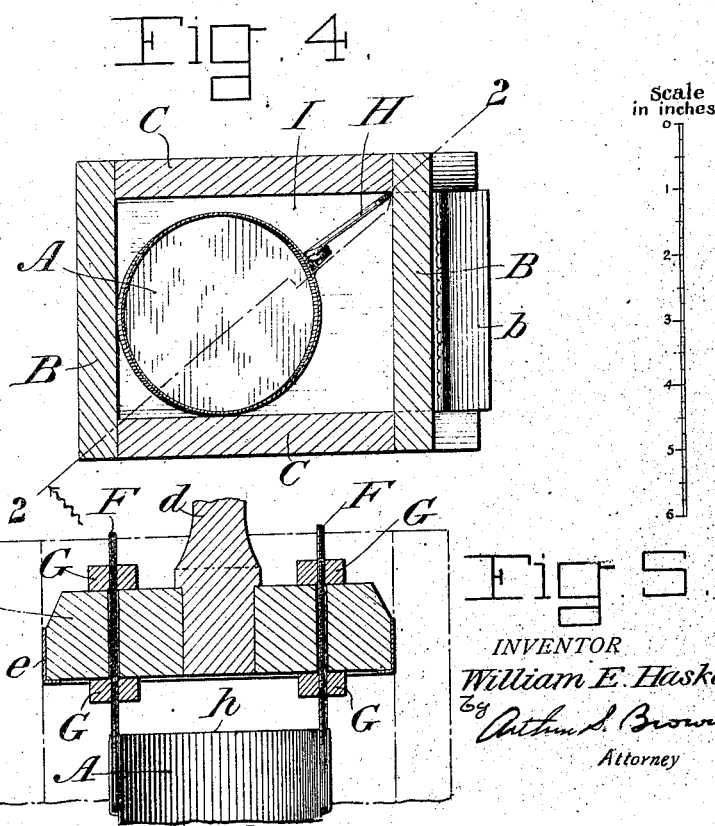

UNITED STATES PATENT OFFICE.

WILLIAM E. HASKELL, OF BRATTLEBORO, VERMONT, ASSIGNOR TO ESTEY ORGAN COMPANY, OF BRATTLEBORO, VERMONT, A CORPORATION OF VERMONT.

ORGAN-PIPE.

967,911. Specification of Letters Patent. Patented Aug. 23, 1910.

Application filed December 29, 1909. Serial No. 535,396.

*To all whom it may concern:*

Be it known that I, WILLIAM E. HASKELL, of Brattleboro, in the county of Windham and State of Vermont, have invented certain new and useful Improvements in Organ-Pipes, of which the following is a specification.

The special object of the present invention is to enable stopped labial organ pipes to produce tones of low pitch without deleteriously affecting the tonal quality and with a much shorter length than has heretofore been necessary.

It has from the earliest period in the history of labial organ pipes been well known that increasing the length of the pipe lowered the pitch and that by making the pipe with a closed or stopped top the pitch is materially lowered as compared with that of an open pipe of the same length. Nevertheless, stopped pipes of low pitch have been necessarily very long, so that in many situations, in which it is desired to use pipe organs, there is not available room for the pipes required to give the desired low pitch.

The present invention is based upon the discovery that by the employment of a complementary chamber the pitch of stopped pipes can be materially lowered without any increase in the length or other usual dimensions.

It is practicable, with the present invention, to lower the pitch ten semi-tones without increasing the length of the pipe, although the best results are obtained if the pitch is lowered not more than nine semi-tones.

The present improvements are illustrated in the accompanying drawings, wherein—

Figure 1, is a vertical longitudinal section of a pipe in the plane indicated by the line 1—1 in Fig. 3. Fig. 2, is a vertical longitudinal section in the plane indicated by the line 2—2 in Fig. 4. Fig. 3, is a cross-section in the plane indicated by the line 3—3 in Fig. 1. Fig. 4, is a cross-section in the plane indicated by the line 4—4 in Fig. 2. Fig. 5, is a detail vertical section illustrating the specific means employed for connecting the complementary chamber with the main chamber of the pipe.

The drawings are made to scale, as indicated, except that the thickness of the wall of the complementary chamber is somewhat exaggerated, since this wall is so thin in practice that it could only be shown by a fine line if illustrated in proportion.

Except for the complementary chamber A, and its relations to the remainder of the pipe, the illustrated pipe is similar to well-known wood stopped labial organ pipes. The main body of the pipe has front and rear walls B, and side walls C. There is shown a usual form of mouth $a$, in the front wall opposite which is a harmonic bridge $b$. There is supplied a usual foot D, and the air is directed across the mouth $a$, through an ordinary windway $c$. At its top the pipe is furnished with an ordinary stopper E, having a handle $d$. The stopper fits tightly within and closes the top of the organ pipe, having a kid packing $e$, around its periphery so as to make an air-tight joint with the walls B, and C. The stopper can be raised and lowered by the handle $d$, for tuning purposes. In all of these particulars there has been selected for illustration a common form of stopped labial organ pipe.

In the case of an organ pipe of the illustrated dimensions, if the stopper were removed, there would remain a plain open pipe which would give the pitch D, having 145 vibrations per second. With the stopper inserted the pitch is EE, having 81 vibrations per second.

Now, by means of the present improvements, the pitch is materially lowered without in any way affecting the ordinary construction and dimensions of the pipe. With the improved complementary chamber A, as illustrated in the drawings, the pitch is lowered nine semi-tones, the tone being thus dropped to GGG, having 48 vibrations per second.

The complementary chamber A, as specifically illustrated, is constituted by a cylindrical tube made of the ordinary metallic composition used in making metal organ pipes. Desirably, the wall should be as thin as practicable, say one-thirty-second (1/32) of an inch, or three sixty-fourths (3/64) of an inch in thickness, dependent upon its size. This tube has a closed bottom $g$, and an open top $h$. The tube has soldered to it, near its upper end, two screw threaded rods F, F, which extend through holes in the stopper E, and on which fit nuts G, both above and below the stopper, by means of which the complementary chamber is suspended and supported from the stopper and can be readily adjusted to exactly the right place with respect to the stopper. The nuts G, also should be such as to render air-tight the holes in the stopper through which the rods F, pass. In practice these nuts have been made of leather, so that they serve to render the holes air-tight without the employment of extra felt washers. It is important that the complementary chamber tube thus suspended should not rattle against the exterior walls of the pipe and, accordingly, the tube has soldered to its lower end a spring H, which presses into one corner of the outer walls of the pipe, as shown in Fig. 4, whereby the lower end of the tube is pressed against two of the walls B, and C, thereby preventing any rattling.

Certain characteristics are important. The tube which constitutes the complementary chamber is surrounded by the outer walls of the pipe and the portion of the pipe between these outer walls and the tube constitutes what may be properly called for the purpose of identification the primary chamber I, of the pipe. It is important that the areas in cross-section of the complementary chamber A, and of the primary chamber I, should be equal. The nearer exact equality is attained the better the acoustic result. Practically, however, if the walls of the complementary chamber tube are made of thin metal, the thickness of the metal can be ignored in calculating the two areas. It is also important that the open space between the top edge of the complementary chamber tube and the lower face of the stopper should be correct. The vertical distance between the top edge of the tube and the lower face of the stopper should be one-fourth the diameter of the tube. This makes the area of the annular passage between the two chambers equal to the area of each chamber. The nearer to exactitude in this respect, the better the result, and there can not be a substantial departure without interfering with the result. The slight tilting of the tube as a result of the anti-rattling spring H, makes the distance between the top of the tube and the bottom of the stopper variable, but the average distance is one-fourth the diameter of the tube.

The complementary chamber communicates directly at its open top with the primary chamber, and solely with the primary chamber, that is to say, the complementary chamber does not open at its top into the surrounding atmosphere, but its communication is with the primary chamber only.

The tube is preferably made cylindrical, as shown, since that is the most economical construction; and it is made of metal since metal can be so thin as to be negligible in computing the areas, and can be so light that the tube can be suspended from the stopper without interfering with the stopper maintaining its position in the pipe by friction. An advantage of suspending the complementary chamber tube from the stopper is that the relation between the two remains the same to whatever position the stopper may be moved in tuning. These preferred constructions, however, can be departed from without affecting the fundamental principles of the invention.

The drawings illustrate a specific pipe with the complementary chamber of nearly maximum length, thus giving a low pitch without increasing the length of the body of the pipe. As heretofore stated, the complementary chamber could be made still longer to produce a note a semi-tone lower, but with some deterioration in the quality of the tone.

Pipes of different pitches can be produced, all of the same length, by simply changing the lengths of the complementary chambers. Likewise, a set of pipes can be made of different pitches by altering the lengths both of the body of the pipe and of the complementary chamber.

The width and depth of the body of the pipe need be no larger than in the case of a pipe producing the same pitch and quality of tone and not equipped with the complementary chamber.

The body may be of metal, and the walls of the complementary chamber may be of wood. The complementary chamber may be of shapes other than cylindrical. Such suggested differences, however, may affect the quality or quantity of the tone. The specific construction shown is preferred, since, with the internal metal complementary chamber of cylindrical shape, the minimum amount of material is employed and the maximum tonal effect is produced.

I claim:

1. A stopped labial organ pipe having, in combination, a wood body having rectangular wooden walls open at the top; a stopper adjustably fitting within the body of the pipe and closing the top thereof; a metallic cylindrical tube within the body of the pipe dividing the interior of the pipe into a surrounding primary chamber and a complementary chamber of equal areas in cross-section, said tube having a closed bottom and an open top, and the upper edge of said tube being located below the under face of the stopper at a distance equal to one-fourth the diameter of the tube; screw-threaded rods secured to the upper end of the tube and extending through holes in the stopper; nuts screwing on said rods above and below the stopper for adjustably holding the tube in place; and a spring secured to the lower end of the tube and bearing against the walls of the pipe; thereby pressing the lower end of the tube against the pipe walls.

2. A stopped labial organ pipe having, in combination, a body open at the top; a stopper adjustably fitting within the body of the pipe and closing the top thereof; and a metallic tube within the body of the pipe dividing the interior of the pipe into a primary chamber and a complementary chamber of equal areas in cross-section, said tube having a closed bottom and an open top, the upper edge of said tube being located below the under face of the stopper at a distance equal to one-fourth the diameter of the tube.

3. A stopped labial organ pipe having, in combination, a body open at the top; a stopper adjustably fitting the body of the pipe and closing the top thereof; and a tube within the body of the pipe dividing the interior of the pipe into a primary chamber and a complementary chamber, said tube having a closed bottom and an open top.

4. An organ pipe having, in combination, a body open at the top; a stopper adjustably fitting the body of the pipe and closing the top thereof; and a tube within the body of the pipe dividing the interior of the pipe into a primary chamber and a complementary chamber, said tube being suspended from and supported by said stopper, and having a closed bottom and an open top which establishes communication between said chambers.

5. An organ pipe having, in combination, a body; a stopper for said body; and a tube within said body dividing the interior of the pipe into a primary chamber and a complementary chamber, said tube being supported by said stopper, and having a closed bottom and an open top which establishes communication between said chambers.

6. A stopped labial organ pipe having an inclosed complementary chamber within the body of the pipe of an area equal to that of the primary chamber of the pipe external to said complementary chamber, and a stopper, said complementary chamber having a closed bottom and an open top communicating with the primary chamber below the stopper, the area of the passage between the complementary chamber and the primary chamber being equal to the area in cross-section of the complementary chamber.

7. A stopped labial organ pipe having a primary chamber and a complementary chamber of equal areas in cross-section, and a stopper, said complementary chamber having a closed bottom and an open top communicating with the primary chamber below the stopper, the area of the passage between the complementary chamber and the primary chamber being equal to the area in cross-section of the complementary chamber.

8. A stopped organ pipe having a closed top primary chamber and a complementary chamber of equal areas in cross-section, said complementary chamber having a closed bottom and an open top communicating with the primary chamber, the area of the passage between said chambers being equal to the area in cross-section of each chamber.

9. A stopped labial organ pipe having a primary chamber, a stopper, and a complementary chamber closed at its bottom and open at its top and communicating with the primary chamber through its open top.

10. A stopped organ pipe having a primary chamber and a complementary chamber closed at its bottom and open at its top and communicating directly through its open top solely with the primary chamber.

In witness whereof, I have hereunto signed my name in the presence of two subscribing witnesses.

WILLIAM E. HASKELL.

Witnesses:
L. W. HAWLEY,
H. F. C. TOEDT.